United States Patent

[11] 3,619,600

[72] Inventor Roger L. Kryder
 Fort Wayne, Ind.
[21] Appl. No. 814,630
[22] Filed Apr. 9, 1969
[45] Patented Nov. 9, 1971
[73] Assignee General Manufacturing, Inc.
 Fort Wayne, Ind.

[54] DIRECT CURRENT FLUORESCENT ILLUMINATING DEVICE
 4 Claims, 7 Drawing Figs.
[52] U.S. Cl. ................................................ 240/11.4 R,
 240/51.11 R, 240/54 R
[51] Int. Cl. .................................................... F21l 3/00
[50] Field of Search ........................................ 240/11.4 R,
 51.11 R, 54 R

[56] References Cited
 UNITED STATES PATENTS
 3,140,054 7/1964 Oharenko .................. 240/11.4 X
 3,249,749 5/1966 Haas ............................ 240/11.4
 3,435,206 3/1969 Swanson ...................... 240/11.4

Primary Examiner—Samuel S. Matthews
Assistant Examiner—Richard L. Moses
Attorney—Beaman & Beaman ABSTRACT: A portable illuminating device utilizing a fluorescent lamp tube adapted to be powered by direct current and particularly suitable for use with automobiles, boats, and the like. The device basically consists of a light-transmitting housing tube of synthetic material which houses the lamp, and a direct current oscillator circuit is located at one end of the housing tube wherein the overall configuration of the device is cylindrical as to be readily handled and stored. The components of the circuit are arranged and constructed to permit accommodation to the configuration of the housing tube. Additionally, a metallic reflector is disposed adjacent the lighting tube which functions as a circuit output conductor to minimize the voltage required to initiate an arc in the lamp.

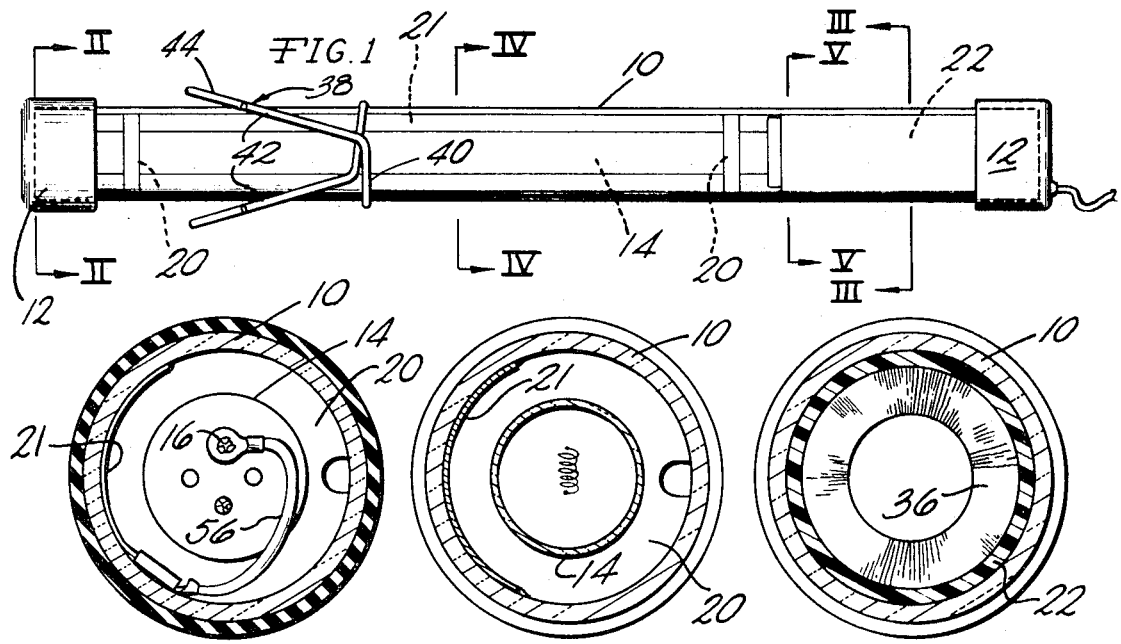
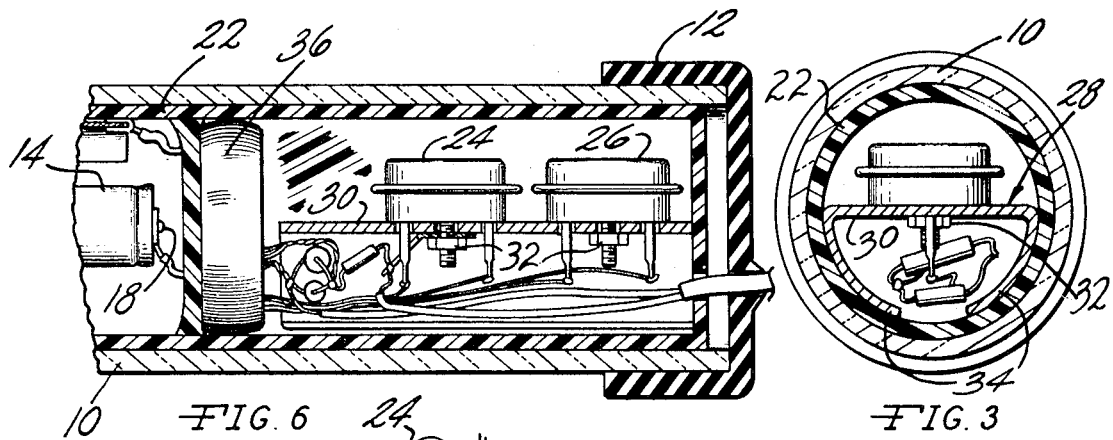
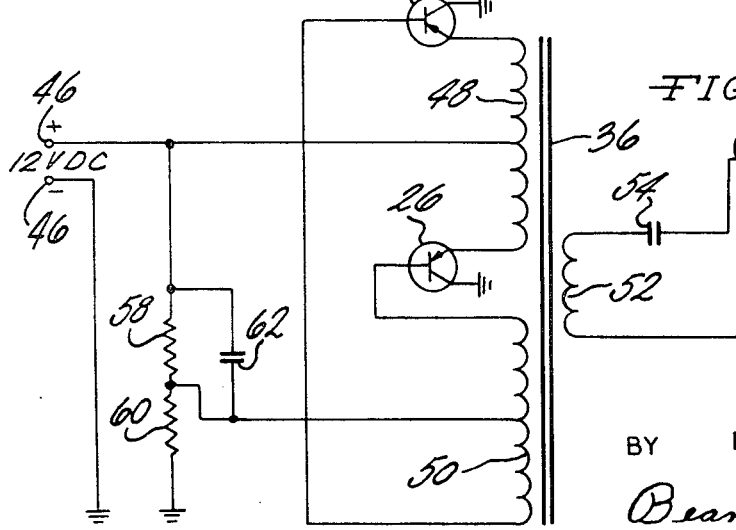
INVENTOR
BY ROGER L. KRYDER
Beaman & Beaman
ATTORNEYS 3,619,600

1

DIRECT CURRENT FLUORESCENT ILLUMINATING DEVICE

BACKGROUND OF THE INVENTION

The invention pertains to portable illuminating devices of the fluorescent type adapted to be energized by direct current.

Portable illuminating devices energized from direct current energy sources are usually of the incandescent type. While a few portable fluorescent-type direct-current-lighting devices have been produced, the elongated length of such devices, and the circuitry and power requirements have discouraged widespread use of this type of device even though efficient lighting characteristics can be obtained.

Portable illuminating devices, such as trouble lamps, and other hand-held-lighting devices which are often used with automobiles, boats and the like are generally restricted to incandescent lamp emission apparatus. Although it is known that fluorescent lamp tubes provide a high efficiency of light for the electrical energy required the use of such lighting devices in portable illumination devices is not widespread for several reasons, including the size and shape required because of the fluorescent tube, and also because of problems encountered in devising a circuit which could effectively energize the fluorescent lamp tube. Additionally, heretofore a fluorescent portable lighting device has not been available wherein the various components of the device were related in an efficient manner as to permit ready handling, yet protect the more fragile components from damage.

SUMMARY OF THE INVENTION

The basic purpose of the invention is to provide a practical, portable, fluorescent lamp illuminating device capable of being supplied from a direct current source wherein the fluorescent tube is protected from damage, and the circuit components for energizing the lamp tube are likewise protected from rough handling and atmospheric conditions.

An additional object of the invention is to provide a portable, fluorescent illumination device at a reasonable price that may be readily handled, stored and shipped, and which is capable of efficiently producing sufficient light for the purpose intended.

In the practice of the invention a cylindrical light-transmitting tube of synthetic plastic material is used as the housing for both a fluorescent lamp tube and the necessary circuitry for lighting the tube. In the described embodiment the direct current power source is external of the illumination device, and is connected to the circuit thereof by means of an electric cord having means for cooperating with the electric circuit of an automobile, through the cigarette lighter, for instance, or a boat or other direct current power source.

Located within the light-transmitting plastic tube, which is preferably of a clear synthetic material, is the fluorescent lamp tube having a metallic reflector disposed adjacent thereto throughout the length of the tube. At one end of the lamp tube the circuitry required is "potted" within a material such as urethane, which protects the circuit from atmospheric conditions. The circuit includes a pair of power transistors serving as switches in an oscillator circuit, and these transistors are mounted upon a metallic heat sink which is shaped to conform to the cylindrical housing tube. Additionally, the circuit includes an annular ferrite core which functions as a transformer, and this core is shaped to fit within the housing tube and be coaxially aligned therewith.

The circuitry associated with the fluorescent lamp tube includes a pair of output conductors through which a high frequency voltage is supplied to the tube. In order to reduce the initial voltage required to strike an arc in the tube the metallic reflector constitutes one of the output conductors, and the proximity of the reflector to the lamp tube thereby significantly reduces required starting voltage.

2

BRIEF DESCRIPTION OF THE DRAWING

The objects and advantages of the invention will be appreciated from the following description and accompanying drawings wherein:

FIG. 1 is an elevational view of an illumination device in accord with the invention, FIG. 2 is an elevational, sectional view as taken along section II—II of FIG. 1, FIG. 3 is an elevational, sectional view through the circuit portion of the device as taken along section III—III of FIG. 1, FIG. 4 is an elevational sectional view taken through the lamp tube and reflector along section IV—IV of FIG. 1, FIG. 5 is an elevational view illustrating the annular transformer taken along section V—V of FIG. 1, FIG. 6 is an enlarged diametrical, elevational view taken through the circuit portion of the illuminating device, the "-potting" material being only symbolically shown for purpose of illustration, and FIG. 7 is a diagram of the circuit preferably employed with the illuminating device of the invention.

DESCRIPTION OF THE PREFERRED EMBODIMENT

The basic component of the illuminating device in accord with the invention consists of a cylindrical housing tube 10 preferably of a clear, transparent, synthetic plastic material having good resistance to abrasion, crushing and fracturing. The ends of the tube 10 are enclosed by cap elements 12 formed of rubber or plastic which may be tightly placed over the ends of the tube to seal the same.

A fluorescent lamp tube 14 is located within the housing tube 10, and this tube is of a conventional configuration including a terminal 16 at the left end, FIG. 1, and a terminal 18 at the right end, FIG. 6. In the described embodiment the tube 14 is of a 15-watt capacity. The tube 14 is held in position within the housing tube 10 by a pair of annular resilient spacers 20 which tightly grip the lamp tube, and the outer surface thereof firmly engages the inner surface of the housing tube. In this manner the lamp tube is firmly held within the housing tube in a shock-absorbing manner.

A metal reflector 21 formed of thin sheet material is located within tube 10 and is disposed adjacent the lamp tube 14 throughout the length thereof. This reflector serves to direct the light of the tube, provide a light shield and also serves as a conductor, as will be later described.

The electric circuitry supplying the lamp tube is housed within a cylindrical opaque plastic housing 22, FIG. 6 located within the right end of the transparent housing 10, FIG. 1. The circuitry, which will be later described, includes a pair of power-switching transistors 24 and 26 mounted upon a heat sink 28 of metal, such as aluminum, having a configuration best appreciated in FIGS. 3 and 6. The heat sink includes a flat portion 30 upon which the transistors are mounted by means of their threaded studs and nuts 32, and arcuate portions 34 extend from the heat sink portion 28 of a configuration concentric with the axis of the housing 22 and lamp tube wherein a maximum heat sink area is located within a minimum volume. The configuration of the heat sink 28 permits the conductors, and capacitor components to be mounted therein, FIG. 6, and the annular transformer core 36 is disposed adjacent the left end of the heat sink, FIG. 6. The transformer core 36 is of a ferrite material and a number of electrical windings are wound upon the core to produce the desired electrical output. The size of the core 36 is such as to provide the desired frequency to operate the lamp, and the annular configuration thereof permits the transformer to be readily accommodated within the housing 22 without requiring excessive space.

In order to reduce the possibility of malfunctioning of the circuitry due to water damage and exposure of the circuit to the atmosphere, and to also improve improved heat absorption characteristics, the housing 22 is preferably filled with a "potting" compound such as urethane or the like. This potting compound is only partially shown in FIG. 6, and it is to be understood that it completely fills the housing 22.

In order to facilitate the support of the lamp a wire clamp 38 may be disposed thereabout which consists of an annular portion 40 which resiliently grips the outer diameter of the housing tube 10 and includes extending portions 42 which terminate in hooks 44. By squeezing the portions 42 together the "grip" of portion 40 upon the housing tube is released permitting the clamp to be axially located along the body to the position desired. The hook portions 44 readily permit the lamp to be suspended from any convenient support.

While the circuit of the invention does not constitute a prime object of the present invention, and the circuit is claimed in detail in the aforementioned application, its features will be appreciated from FIG. 7.

The DC power supply illustrated is of 12 volts, and will normally constitute the power system of an automobile, truck or boat. The conductors 46 preferably terminate in a plug adapted to be received within a vehicle cigarette lighter whereby a negative potential is supplied to the ground, and a positive potential is supplied to the circuit components through the illustrated conductor.

The switching transistors 24 and 26 may be of a 15 amp 15-volt type which is manufactured by Delco, D.S. 501. The transformer windings 48, 50 and 52 are wound upon the annular ferrite core 36, and the winding 48 constitutes the primary winding of 74 turns of No. 24 wire. The winding 48 is center tapped and is connected to the emitters of the transistors. Center tapped winding 50 constitutes the feedback winding supplying the base terminals of the transistors and this winding has 96 turns of No. 30 wire. The secondary winding 52 of the transformer comprises 800 turns of No. 34 wire, and this winding is connected to the terminals 16 and 18 of the fluorescent lamp tube 14 through a capacitor 54 of 0.047 mfd. 200 volts, which constitutes the output phase shift capacitor for limiting the current to the lamp to 360 X ma. It will be noted that the reflector 21 constitutes a portion of the output conductor of the winding 52, and the end of the reflector is connected to the light tube terminal 16 by a short conductor 56, FIG. 2.

The collector terminals of the transistors 24 and 26 are grounded, and the resistances 58 and 60 are likewise connected between the positive voltage supply and the ground to form the transistor biasing network to start the transistors oscillating under low-temperature conditions. Resistance 58 is 100 ohm, one-half watt, and resistance 60 is of a 220-ohm capacity.

Capacitor 62 is a 1 mfd. capacitor, 50 volts, and is connected in parallel with the X 100-ohm resistor 58 for the purpose of eliminating "spikes" from appearing between the emitter and the bases of the transistors.

The disclosed circuit constitutes a self-excited oscillator circuit, and the frequency will be determined by the area of the core, the flux density of the core material and the number of turns on the primary winding. As the core saturates through the circuit of one transistor the feedback winding 50 will turn that transistor off and place the other transistor in the circuit. In the designed circuit this cycling occurs approximately 2,500 times per second. This oscillation starts because one transistor will always have a lower resistance than the other and will therefore conduct first.

In the disclosed circuit the input is approximately 13 watts at 1.1 amperes, and 12 watts of power is produced at the output with a 90 percent efficiency. The output phase shift capacity is 0.047 mfd. the ferrite core flux density is 4900 Gauss with a 15-watt capacity. The output voltage of the primary winding 52 is 375 volts, peak to peak.

Previous to the lamp igniting it has a very high resistance and thus the capacitor 54 is nearly short circuited and the full voltage, 375 volts, peak to peak, appears across the lamp tube terminals. As soon as the light tube ignites the resistance is lowered and capacitor 54 begins to limit the current to the lamp tube by causing the tube to be out of phase with the power source.

The proximity of the reflector 21 to the lamp, and the utilization of the reflector as a conductor of the high voltage output, permits the arc to strike within the lamp at 375 volts, peak to peak. Without the presence of the reflector 21 serving as a conductor of the primary output the circuit would require approximately 850 volts to strike the initial arc in the lamp tube. Thus, it will be appreciated that the circuit has been significantly simplified due to the relationship of the reflector to the lamp tube.

By housing the lamp tube and the circuit components within a single housing tube 10 the likelihood of damage occurring to the lamp tube, or to the components, is minimized and the presence of the rubber or plastic caps 12 at the ends of the tube also provide excellent protection against damage to the illuminating device as their enlarged diameter prevents contact of the tube 10 with the floor or ground. In that the heat generated by the lamp tube is small, the danger of burning one's self upon the illuminating device is not present, and a very effective, safe and efficient portable illuminating device is produced by the practice of the invention.

It is appreciated that various modifications to the inventive concept may be apparent to those skilled in the art, and it is intended that the invention be defined only by the following claims:

I claim:

1. A portable, fluorescent, illuminating device energized by direct current comprising, in combination, an elongated housing having an axially extending light-transmitting portion and first and second ends, a fluorescent lamp tube within said housing in axial alignment with said light-transmitting portion, circuit housing means located at said housing first end, a direct current oscillator circuit within said circuit housing means having a high frequency output, direct current supply conductors connected to said circuit and conductors connecting said high-frequency output to said lamp tube, one of said high-frequency output conductors comprising a metallic reflector disposed adjacent said lamp tube to decrease the voltage required to strike an arc in said lamp tube.

2. A portable, fluorescent, illuminating device energized by direct current comprising, in combination, an elongated, cylindrical, housing tube of light-transmitting material having first and second ends, a fluorescent lamp tube within said housing tube, circuit housing means located within said housing tube first end whereby said entire device is of a cylindrical configuration, a direct current oscillator circuit within said circuit housing means having a high-frequency output, said oscillator circuit including a pair of switching transistors, a metal heat sink located within said circuit housing means having a flat portion and depending arcuate portions corresponding to the configuration of said cylindrical housing tube, said transistors being mounted upon said flat portion of said heat sink, direct current supply conductors connected to said circuit, and conductors connecting said high-frequency output to said lamp tube.

3. A portable, fluorescent, illuminating device energized by direct current comprising, in combination, an elongated cylindrical, housing tube of light transmitting material having first and second ends, a fluorescent lamp tube within said housing tube, circuit housing means located within said housing tube first end whereby said entire device is of a cylindrical configuration, a direct current oscillator circuit within said circuit housing means having a high frequency output, said oscillator circuit including an annular ferrite core having an axis, electrical conductor windings wound upon said core, said core being of an outer diameter less than the inner diameter of said cylindrical housing tube and substantially coaxially aligned with the axis of said cylindrical housing tube, direct current supply conductors connected to said circuit, and conductors connecting said high frequency output to said lamp tube.

4. A portable, fluorescent, illuminating device energized by direct current comprising, in combination, an elongated, cylindrical, housing tube of light-transmitting material having first and second ends, a fluorescent lamp tube within said housing tube, circuit housing means located within said housing tube first end whereby said entire device is of a cylindrical configuration, a direct current oscillator circuit within said circuit housing means having a high-frequency output, a metallic reflector disposed adjacent said lamp tube extending the length thereof, direct current supply conductors connected to said circuit, conductors connecting said high-frequency output to said lamp tube, said reflector constituting one of said high-frequency output conductors thereby decreasing the voltage required to strike an arc in said lamp tube.

* * * * *